(12) United States Patent
Van Lunteren

(10) Patent No.: US 11,099,844 B2
(45) Date of Patent: Aug. 24, 2021

(54) VECTOR-BASED TILED PROCESSING WITH DATA-SHARING NEIGHBORING TILES

(71) Applicant: International Business Machines Corporation, Armonk, NY (US)

(72) Inventor: Jan Van Lunteren, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/413,842

(22) Filed: May 16, 2019

(65) Prior Publication Data

US 2020/0364046 A1 Nov. 19, 2020

(51) Int. Cl.
*G06F 9/30* (2018.01)
*G06F 17/16* (2006.01)
*G06F 15/80* (2006.01)
*G06F 9/38* (2018.01)

(52) U.S. Cl.
CPC ........ *G06F 9/30036* (2013.01); *G06F 9/3885* (2013.01); *G06F 15/8053* (2013.01); *G06F 17/16* (2013.01)

(58) Field of Classification Search
CPC .. G06F 9/30036; G06F 17/16; G06F 15/8053; G06F 9/3885
USPC ........................................................ 708/520
See application file for complete search history.

(56) References Cited

U.S. PATENT DOCUMENTS

| 10,922,077 | B2* | 2/2021 | Espig ................ G06F 17/16 |
| 2015/0215631 | A1 | 7/2015 | Zhou et al. |
| 2016/0283441 | A1 | 9/2016 | Grinberg et al. |

OTHER PUBLICATIONS

Holewinski, J., et al., "High-Performance Code Generation for Stencil Computations on GPU Architectures", ICS'12, Jun. 25-29, 2012, 10 pages.

* cited by examiner

*Primary Examiner* — Tan V Mai
(74) *Attorney, Agent, or Firm* — Scully, Scott, Murphy & Presser, P.C.; Daniel P. Morris

(57) ABSTRACT

Performing n-dimensional stencil processing may include providing a memory unit organized in memory banks for storing elements of an nD matrix, processing the matrix using a stencil vector unit in a first processing direction of the matrix tile-wise(/d). Data elements of the matrix can be equally distributed over the memory banks, and the number of memory banks can be equal to the number of data elements processable by the stencil vector unit in parallel, which is equal to the number of data elements in a width direction of one of the tiles. Additionally, the boundary elements can be grouped in the width direction of the tiles into a nD sub-matrix, and the nD sub-matrix can be processed equally to the processing the nD matrix orthogonal to the first processing direction.

20 Claims, 7 Drawing Sheets

VECTOR-BASED TILED PROCESSING WITH DATA-SHARING NEIGHBORING TILES

BACKGROUND

The present disclosure relates generally to a method of tiled processing, and more specifically, to a computer-implemented method for performing n-dimensional stencil processing using vector processing units adapted for processing stencils in parallel. The present disclosure relates further to a system for performing n-dimensional stencil processing, and a computer program product.

The requirement for ever faster processing of data, in particular data organized as matrix data, is ever increasing. For this is not only true for weather simulations, but any kind of modeling, machine learning processing, traffic models, "big data" problems in commercial data in many other scientific, industry and government use cases. If the related large data structures are larger than the cache of a computing system or even main memory, then typically the data structure is split into smaller portions, denoted as tiles, which are then loaded independently of the other tiles of the data structure into the cache/scratchpad memory or main memory, respectively, in order to be processed. After the completion of the processing, the processed tiles are then written back from the cache/scratchpad memory to main memory or from main memory to disk if required. Tiled processing is, e.g., typically applied for matrix-multiplications involving large matrices, e.g., for calculating long 1D (dimension) and/or 2D FFTs (Fast Fourier Transformation), and for stencil computation of large 2D and/or 3D matrices.

For particular applications, processing a tile may also require access to the edges of neighboring tiles. This introduces a problem that can substantially reduce the efficiency and performance gains that can be obtained by tiled processing. One example is a 2D Jacobi iteration (compare FIG. 2). Each iteration may involve updating the matrix elements by computing the arithmetic mean of all neighboring cells for a given cell of the matrix. If the matrix would be partitioned into tiles of 8×8 elements, then all cells that are not at the boundary of the tile can be updated based on the contents of each tile only. However, updating the border cells would require also the values of cells at the boundaries of neighboring tiles, which are often called halo regions. This involves a data exchange and synchronization with the processing functions that operate on the individual tiles which can substantially impact resource utilization and degrade performance of the underlying computing system.

In order to address this problem and to reduce communication and synchronization efforts between the processing functions that operate on the individual tiles, the tiles are often enlarged to also include the boundaries of the neighboring tiles. As a result, the elements that are part of the original tile (before enlarging) can now be calculated independently on the other tiles in a given iteration. However, as a result, the tiles will now become overlapping—the overlaps are often called "ghost zones"—resulting in redundancy in storage and processing.

SUMMARY

According to one aspect of the present invention, a computer-implemented method for performing n-dimensional (nD) stencil processing using vector processing units adapted for processing stencils in parallel may be provided. The method may comprise providing a memory unit organized in a plurality of memory banks for storing elements of an nD (n-dimensional) matrix, and processing, in a first phase, the nD matrix using a (n−1)D stencil vector unit in a first processing direction of the matrix tile-wise. Thereby, data elements of the nD matrix processed by the stencil vector unit in parallel may be equally distributed over the memory banks, and the number of memory banks may be equal to the number of data elements processable by the stencil vector unit in parallel, which may be equal to the number of data elements in a width direction of one of the tiles.

Furthermore, the method may comprise grouping boundary elements in the width direction of the tiles into an nD sub-matrix, and processing, in a second phase, the nD sub-matrix equally to the processing the nD matrix in the first phase orthogonal to the first processing direction.

According to another aspect of the present invention, a system for performing n-dimensional (nD) stencil processing using vector processing units adapted for processing stencils in parallel may be provided. The system may comprise a memory unit organized in a plurality of memory banks for storing elements of an nD (n-dimensional) matrix, and an (n−1)D stencil vector unit adapted for processing, in a first phase, the nD matrix in a first processing direction of the matrix tile-wise. Thereby, the data elements of the nD matrix processed by the stencil vector unit in parallel may be equally distributed over the memory banks, and the number of memory banks may be equal to the number of data elements processable by the stencil vector unit in parallel, which may be equal to the number of data elements in a width direction of one of the tiles.

The system may further comprise a grouping unit adapted for grouping boundary elements in the width direction of the tiles into a nD sub-matrix. Thereby, the (n−1)D stencil vector unit may be adapted for processing, in a second phase, the nD sub-matrix equally to the processing the nD matrix in the first phase orthogonal to the first processing direction.

The proposed computer-implemented method for performing n-dimensional stencil processing using vector processing units adapted for processing stencils in parallel may offer multiple advantages and technical effects:

The proposed concept may allow to fully utilize the available processing capacity of the stencil vector units. Furthermore, because of the limited "processing depth" of the boundary elements which may be determined only by the size of a single stencil, (in contrast to the first step, where the "processing depth" is determined mainly by the storage capacity of the memory component), FIFO ($1^{st}$ in, $1^{st}$ out) units may be used to store the boundaries of processed tiles in the second step, allowing to efficiently process the tile boundaries in the second stage.

The proposed concept may also allow to fully utilize the available memory bandwidth of the memory units that are used to store the matrix elements, in all phases of the stencil computation, including the processing of the halo regions, as well as during the exchange of data between vector processing units and/or memory units involved in the processing of different tiles.

Furthermore, the proposed concept may additionally allow to tightly control the overlap between the operations that read the matrix elements from the memory units, the transfer of these matrix elements to the vector processing units, the processing of the matrix elements by the vector processing units, the transfer of the processing results to the memory units, and the writing of the processing results into the memory units. Hence, the proposed concept may allow the simultaneous optimization of the utilization of the available processing capacity of the stencil vector units, the available bandwidth of the memory units, and the available bandwidth of the interconnects (e.g., data buses) between the memory units and the stencil vector units. This may result in substantial performance improvements, e.g., reductions in overall execution time of a given stencil computation as well as the number of stencil computations performance that can be performed per unit time, and also in substantial improvements in power efficiency.

The proposed concept is thus advantageously addressing memory/cache-to-processing-unit-back-to-memory/cache bottleneck for large-scale matrix operations, like matrix multiplications. Thus, the proposed concept may accelerate the execution of applications and a wide variety of application areas, like scientific computations, weather predictions, oil exploration simulations, complex navigational tasks, artificial intelligence, but also stock market predictions, logistic chain predictions, warehouse management, shop-floor optimization, and many more.

The underlying concept is not limited to a specific computer architecture and may be implemented across all known computer system architectures, in particular in von-Neumann machines. The proposed concept is also independent from specific operating systems and may also partially be implemented in hardware for an even faster execution of matrix operations.

In the following, additional embodiments—also applicable to the related stencil processing unit—will be described:

According to one permissive embodiment of the method, n may be equal to 2 or n may be equal to 3. Higher numbers may be possible. However, the case for N=2 and the case for N=3 may be the most common one and applicable to problems in 2D and 3D space for stencil computation and matrix-multiplication in general.

According to one advantageous embodiment of the method, the memory unit may comprise dual-port memory cells. The addressable cells may store one system word each. By using dual-port memory port memories read and write processes may be handled in parallel in the memory unit. There may be no delay for switching between read and write operations. This may guarantee the fastest possible operation speed of the memory unit.

According to one permissive embodiment of the method, the boundary elements may comprise two elements at each end of a row in the tile. Such a configuration may be suitable for comparably simple stencils. For more complex and larger stencils underlying the computing process for a new matrix element, a higher number of matrix elements may be declared as boundary elements. This may allow a flexible handling of differently sized and structured stencils.

According to one possible embodiment of the method, outer elements—i.e., the first and the last in a row (or a column)—do not need to be updated during processing of a tile because these matrix elements may be updated during the second phase anyway. Thus, the processing power and consequently also energy may be saved.

According to another advantageous embodiment of the method, the processing of the first phase and the processing of the second phase may be performed in parallel. This may be performed by moving the respective matrix elements for the second phase to a parallel memory. This way, also tile-wise interleaving may be possible; e.g., a processing of elements of a tile in a first direction may be done independently of elements of a non-overlapping tile for the processing in the second, orthogonal direction of the matrix.

According to another possible embodiment of the method, the width of a tile—which may be for the current architectures between, e.g., 8 and 64 elements wide—may be comparable small if compared to the depth of the matrix. For typical matrix problems solved with the proposed method, the depth of the matrix may typically be in the range of tens of thousands of rows.

According to one further advantageous embodiment of the method, a bank offset generator and a data shuffler may be adapted to distribute matrix elements equally across the memory banks for an always parallel access—and read them also back. This process may not be trivial; however, it may guarantee that all elements of a row of a tile may be accessed in one step because the elements may be distributed across the banks of the memory unit. Thus, no second access to the memory banks may be required in order to access all elements of a row. This may represent a significant performance advantage if compared to standard access methods to memory banks. For these, it happens more or less often, that a second access to the memory banks is required in order to read one row. The data shuffler may ensure that the elements of the row are presented for processing in the correct order.

It may also be noted that this way all elements of a column of a tile may be accessed in one step because the elements may also be distributed across the banks of the memory unit. Thus, the same advantageous effect may be achieved in the second phase of the proposed concept.

According to one embodiment of the method, the width direction is a 1-dimension measure or a 2-dimensional measure. Thus, the width may be measured with a vector in mind of with a 2D matrix in mind. As mentioned above, that here proposed method may also work in a higher dimensional space with the consequence that also the width direction may be measured in higher dimensional matrices.

According to another embodiment of the method, data elements not being processed in the first phase and required during the second processing phase may be stored in an intermediate storage and retrieved from there during the second processing phase. The intermediate storage may be a cache unit of the stencil vector unit avoiding access to the memory bank at all. This may speed up the processing even more.

According to yet another embodiment of the method, data elements, during the processing in the second phase, comprising boundary elements required for a processing of subsequent nD sub-matrices may be stored in a first-in-first-out storage unit and are retrieved during the processing of the respective subsequent nD sub-matrices. Also this feature may enable the method for faster execution. Also here, a repeated retrieval from the memory banks may be avoided.

According to still another embodiment, the method may also comprise configuring the stencil vector unit before each computation. E.g., weighting factors or other parameters required for the processing may be updated before each computation. This may increase the flexibility in the data element updated as well as the ability to handle a plurality of stencil types and computation methods.

It may be noted that also another even more embodiment is possible: If multiple units are available, each of which comprising a vector stencil unit and respective memory banks—as discussed above—a third processing phase may be executed. During this, data elements may be transferred between the vector stencil units that are needed for computing stencils element results on overall tile boundaries. i.e., at the outer side of the complete matrix. This may complete the processing of the matrix for data elements than cannot have neighboring elements in other tiles.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
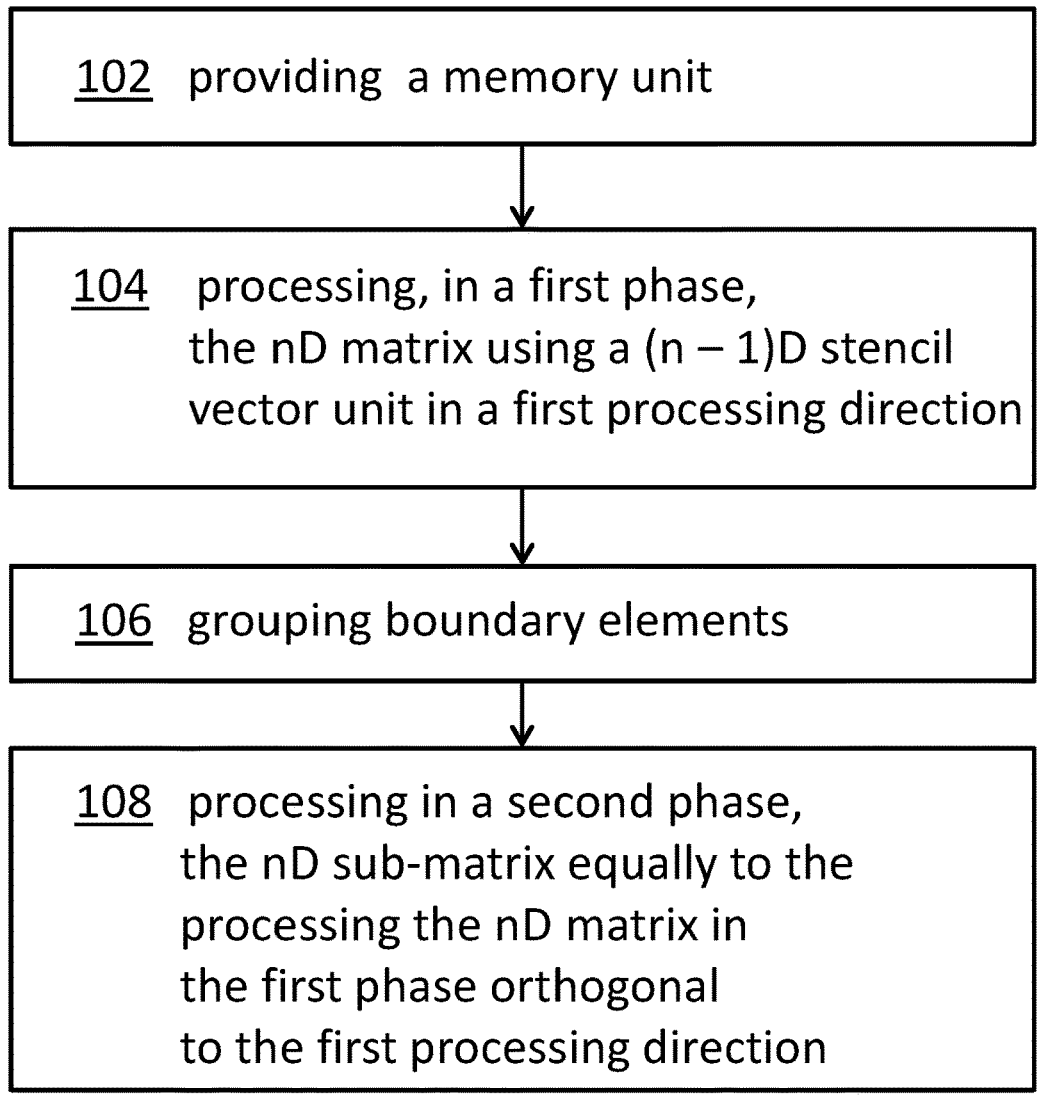

Preferred embodiments of the invention will be described, by way of example only, and with reference to the following drawings:

FIG. 1 shows a block diagram of an embodiment of a computer-implemented method for performing n-dimensional stencil processing using vector processing units adapted for processing stencils in parallel.

Figure 2:
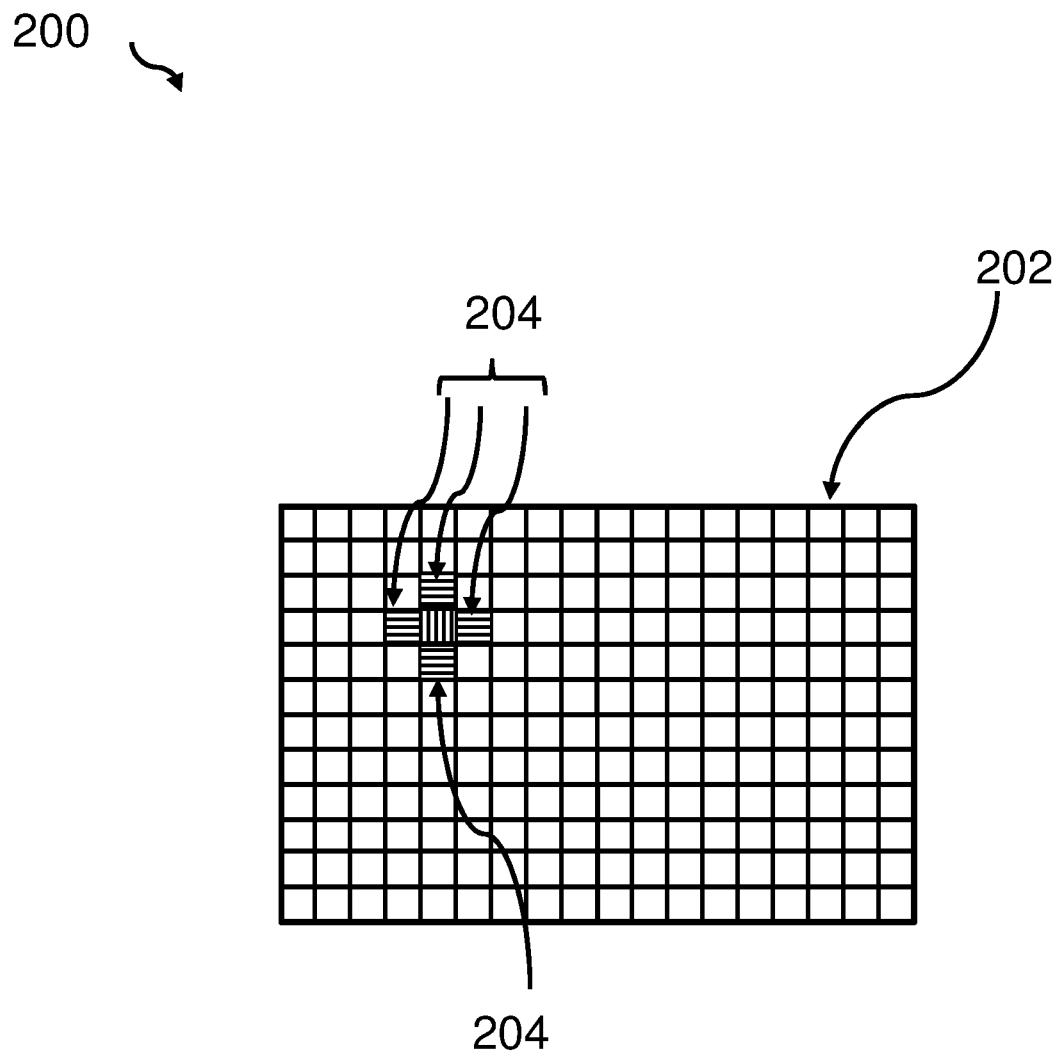

FIG. 2 shows a portion of a matrix.

Figure 3:
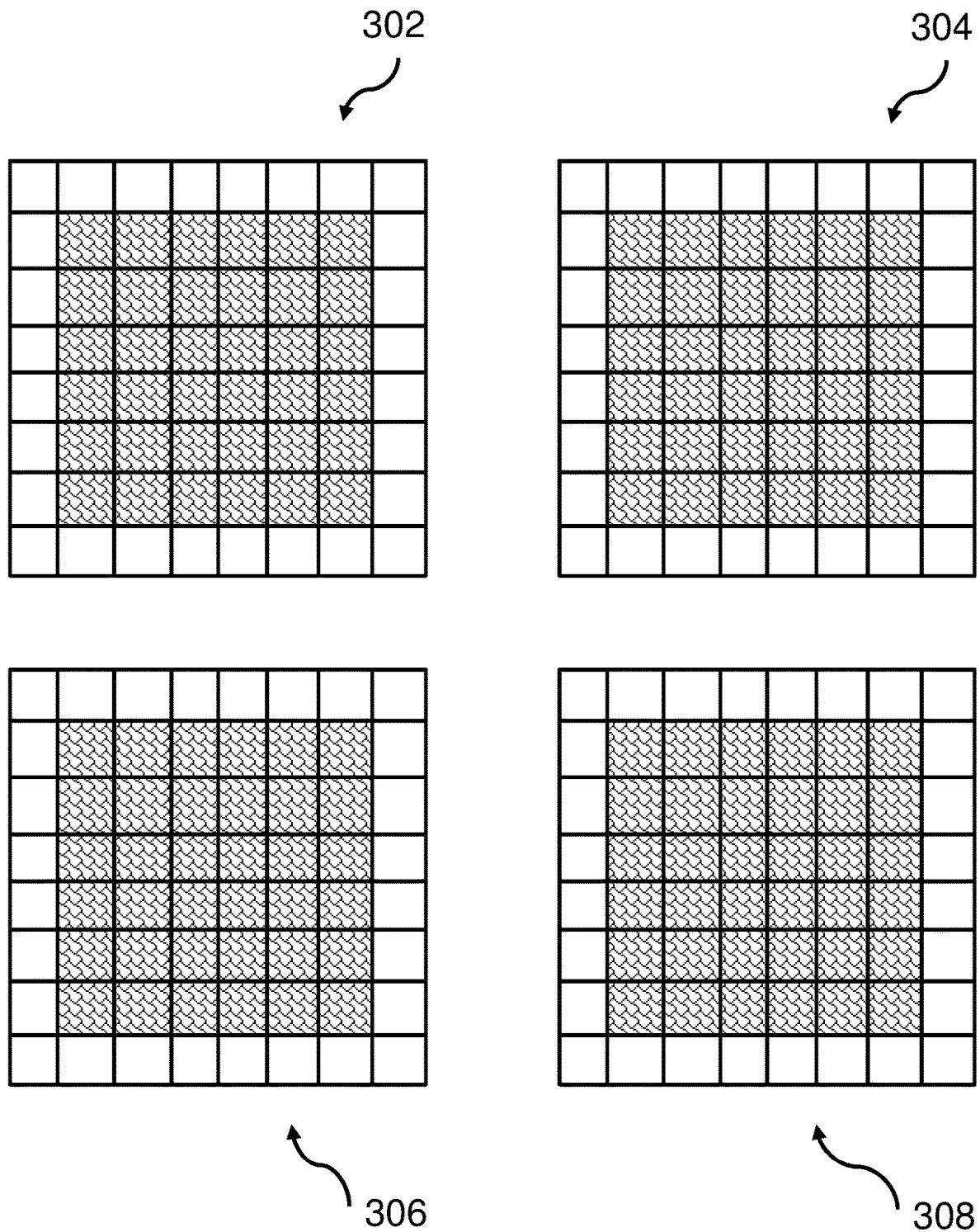

FIG. 3 shows partitions or tiles of a larger matrix.

Figure 4:
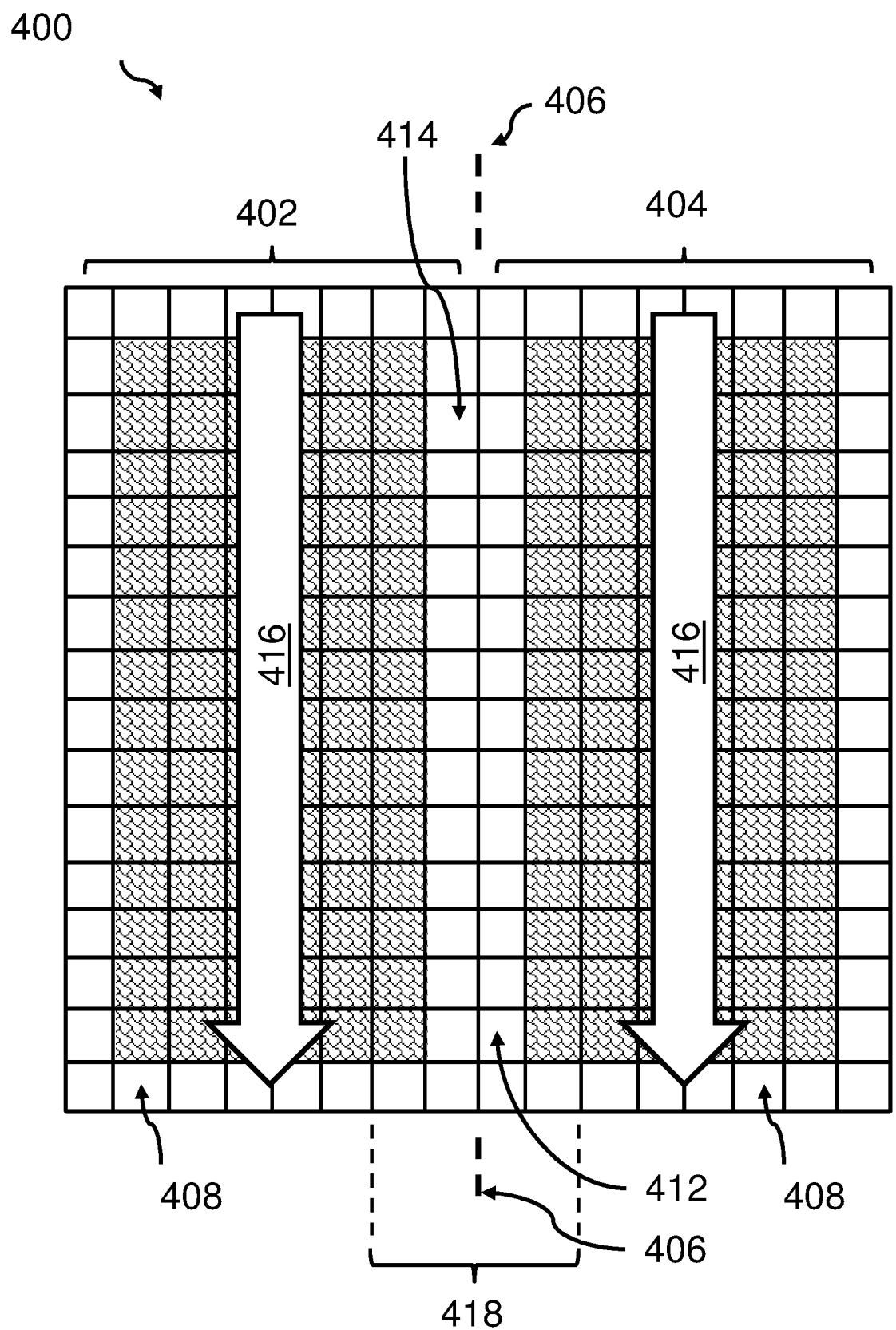

FIG. 4 shows a diagram of a tile processing in a first direction.

Figure 5:
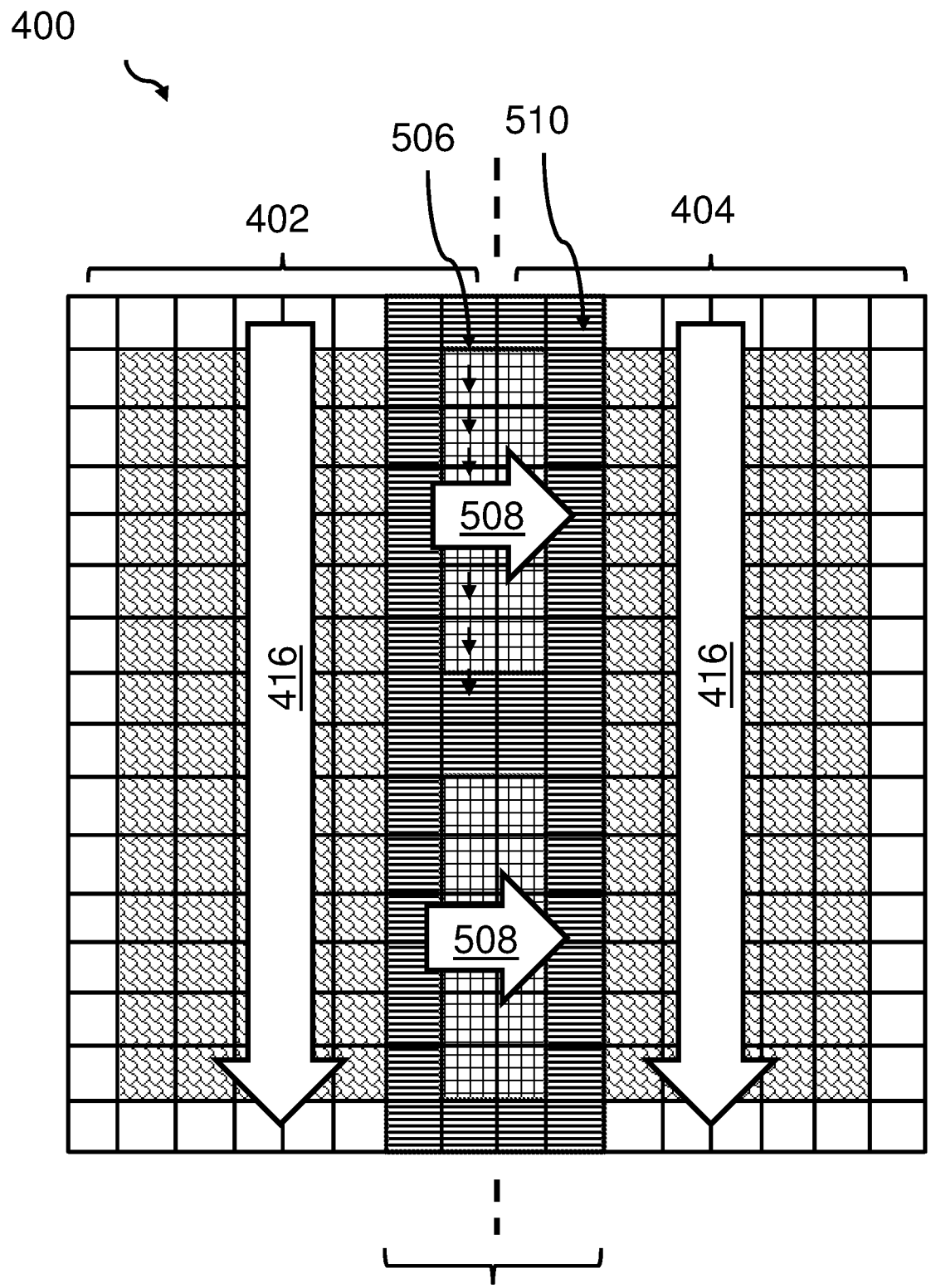

FIG. 5 shows a diagram of the tile processing in the second direction.

Figure 6:
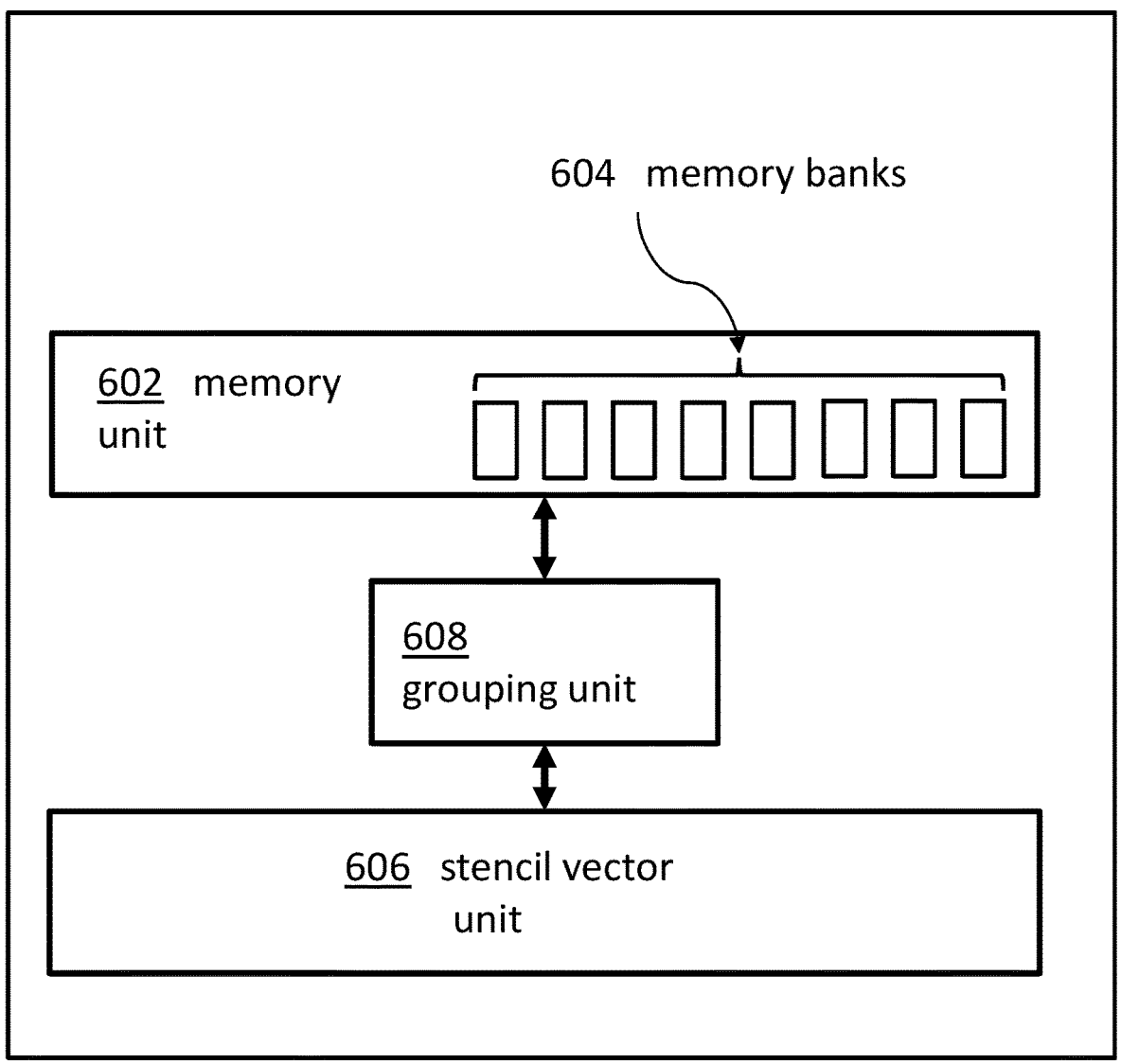

FIG. 6 shows a block diagram of the system for performing n-dimensional (nD) stencil processing using vector processing units.

Figure 7:
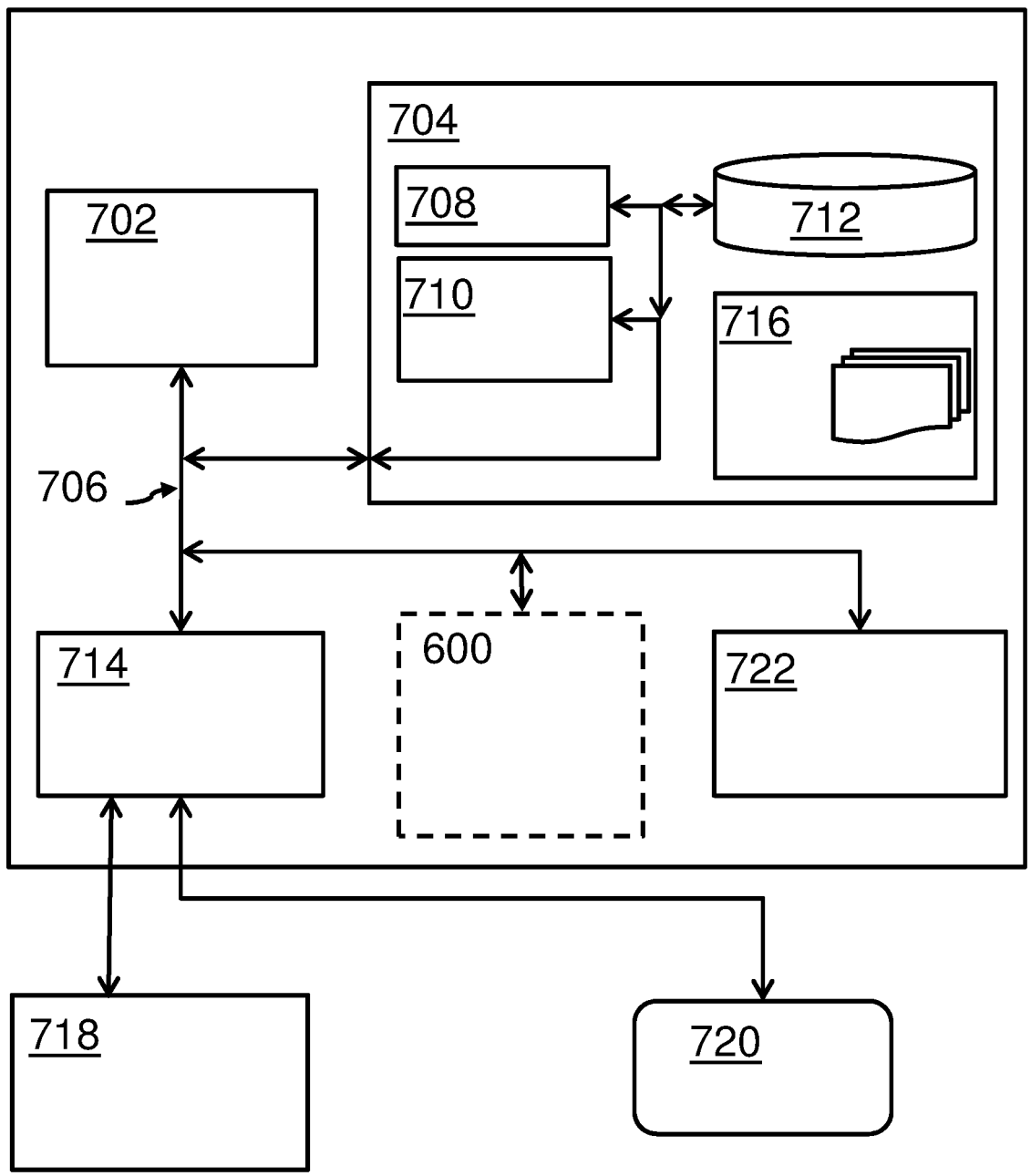

FIG. 7 shows a block diagram of the computing system comprising the system for performing n-dimensional stencil processing according to FIG. 6.

DETAILED DESCRIPTION

The present disclosure in embodiments may address unnecessary overhead, overlapping and performance degradation in stencil processing. For instance, a proposed concept may reduce overhead in stencil processing in particular unnecessary communication and synchronization as well as double processing; in addition, the usage of the available memory—in particular cache and main memory may be optimized.

In the context of this description, the following conventions, terms and/or expressions may be used:

The term 'n-dimensional (nD) stencil processing' may denote a processing scheme to update matrix elements according to neighboring matrix elements based on a specific pattern, i.e., the stencil. In a simple form, the stencil may select neighboring matrix elements to the north, the South, the East, and the West seen from a central matrix element to be updated. More complex stencils may be possible.

The term 'vector processing unit' may denote a plurality of processing modules working independently from each other in parallel on the same operations but on different data. However, also a fast exchange and/joint access of/to data between the cores may be possible.

The term 'memory unit' may denote a standard memory of a computing system like, e.g., the main memory (e.g. RAM), cache memory of any level, an extension memory, etc. The memory unit may be organized in memory banks such that firstly, a memory bank may be selected for data access, and within a bank a linear address space may be used. The same linear address space may exist within each memory bank.

The term 'nD matrix' (or 'n-dimensional) matrix may denote a matrix of a dimension n. Consequently, an (n−1)-dimensional matrix ((n−1)D) has one dimension less than the nD matrix. If, e.g., the nD matrix is a 3-dimensional matrix, then the dimension of the related (n−1)D matrix is 2.

The term 'first phase' may denote a processing of rows of a tile of a matrix in a first processing direction. If a 2-dimensional matrix is envisioned, and the width of the matrix is measured from left to right so that the depth of the matrix is measured from top to bottom, the first processing direction may run through the rows from top to bottom of the tile.

Consequently, the processing of the second phase and the second direction which is orthogonal to the first direction would run on tiles from left to right, i.e., in a width direction of a tile.

The term 'stencil vector unit' may denote a special form of a vector processing unit.

The term 'tile-wise' may denote a processing tile by tile.

The term 'equally distributed' may denote that each matrix element of a row may always be stored in a different memory bank if the number of elements in a row is equal to the number of memory banks, and the 2D example. For a 3D case, the dependencies are little bit more complicated but work out as well. Thus, all elements of a 2D plane of the 3D matrix need to be accessed at once in the memory banks.

The term boundary elements' may denote one or a plurality of elements of the outer border of a respective tile. Boundary elements may be bridge elements to the next tile in the direction from a center of a tile to the boundary element.

The term 'tiles' may denote portions of a larger matrix. Using tiles for matrix operations may be useful in order to map the respective portions into the memory system in order for faster processing.

The term 'dual-port memory' may denote a memory device allowing a read and write process at the same time.

The term 'outer elements' may denote a subgroup of boundary elements.

The term 'data shuffler' may denote a unit—either implemented in hardware or in software—ensuring that the vector elements, when these are being written into the memory unit, are sorted in a way to ensure that these vector elements are stored in different memory banks so that these can be written in parallel, i.e., in a single cycle. The same 'data shuffler' unit may be used when the vector elements are being read from the memory unit, in order to generate, i.e., restore, the original sequence of the vector (for 2D, the respective matrix positions).

The term 'bank offset generator' may denote a unit—either implemented in hardware or in software—adapted for calculating offsets of vector (or sub-matrix) elements that are written into different memory banks within a memory unit, after being sorted by the data shuffler, and for calculating offsets of the vector (or sub-matrix) elements that are read from different memory banks within a memory before being sorted by the data shuffler to restore the original sequence of the vector.

In the following, a detailed description of the figures will be given. All instructions in the figures are schematic. Firstly, a block diagram of an embodiment of the inventive computer-implemented method for performing n-dimensional stencil processing using vector processing units adapted for processing stencils in parallel is given. Afterwards, further embodiments, as well as embodiments of the system for performing n-dimensional stencil processing using vector processing units adapted for processing stencils in parallel, will be described.

FIG. 1 shows a block diagram of an embodiment of the computer-implemented method 100 for performing n-dimensional (nD) stencil processing—e.g., n=2 or n=3—using a vector processing unit adapted for processing stencils in parallel. The method 100 comprises providing, 102, a memory unit—e.g., a memory sub-system, e.g., based on a RAM—organized in a plurality of memory banks for storing elements of an nD (n-dimensional) matrix, in particular 2D or 3D matrices.

The method 100 additionally comprises processing, 104, in a first phase, the nD matrix using a (n−1)D stencil vector unit in a first processing direction of the matrix tile-wise. Thereby, the processing unit, i.e., stencil vector unit is adapted for processing all elements of the stencil in parallel.

Furthermore, the data elements of the nD matrix processed by the stencil vector unit in parallel are equally distributed over the memory banks, and the number of memory banks is equal to the number of data elements processable by the stencil vector unit in parallel, which is equal to the number of data elements in a width direction of one of the tiles. It may be noted that the data elements processed by the stencil vector unit in the width direction may be viewed as a 1-dimensional structure for a 2D matrix or 2-dimensional for a 3D matrix.

Additionally, the method 100 comprises grouping, 106, boundary elements—in particular two at each end of each row in the tile—in the width direction of the tiles into a nD sub-matrix. It may be noted that this does not require a data movement; the grouping is understood to be logical.

Moreover, the method 100 comprises processing, 108, in a second phase, the nD sub-matrix equally to the processing the nD matrix in the first phase orthogonal to the first processing direction.

FIG. 2 shows—as baseline requirement for the proposed concept—a portion of a matrix 200. For example, for 2D Jacobi iteration, each iteration involved updating the matrix elements by computing the arithmetic mean of each cell's 202 for neighbors 204. This is illustrated in FIG. 2 for the vertically striped cell 202 that is updated based on the value of the horizontally striped neighboring cell's 204. Although the figure shows the update of a single cell based on a stencil computation, all cells will be updated in each iteration based on the original values of the neighboring cells (i.e., the values at the beginning of the iteration). Once all cells have been updated, then the entire process is repeated in the next iteration based on the new cell values.

If the matrix would be partitioned into, e.g., 4 tiles 302, 304, 306, 308 of 8×8 elements, then all cells that are not at the boundary of the tile can be updated based on the contents of each tile only. This is illustrated in FIG. 3. Updating the border cells—shown as white square elements—requires the values of the cells at the boundaries of neighboring tiles, which are often called halo regions. This requires a data exchange and synchronization between the processing functions that operate on the individual tiles which can substantially impact resource utilization and degrade performance in implementations according to the state-of-the-art. It may be noted that the core cells of each one of the tiles are marked with structured squares. The result of these matrix elements can be updated with other cells of the same tiles because each of the structured squares is always surrounded by four other cells for, e.g., Jacobi iterations. However, it may be noted that Jacobi iterations is only one method for matrix operations. The person skilled in the art will know many more methods requiring information about surrounding cells of a matrix, i.e., stencil forms.

In order to address this problem and reduce communication and synchronization efforts between the processing functions that operate on the individual tiles, the tiles are often enlarged to also include the neighboring tiles, according to the state-of-the-art. As a result, the elements that are part of the original tile (before enlarging) can now be calculated independently of the other tiles in a given iteration. However, as a result, the tiles will now become overlapping (the overlaps are often called ghost zones) resulting in redundancy in storage and processing.

FIG. 4 shows the basis for an elegant solution to the above described problem. While focusing on vector-based processing of multiple stencils in parallel, the proposed concept may be used for any type of stencils, including 2D and 3D, as well as other data structures involving potentially "overlapping" tiles.

It may be assumed that the matrix is stored in a memory system comprised of multiple memory banks, while each bank can be used to read or write a single matrix element. In case of dual-ported memory units, each bank can be used to independently read and/or write separate matrix elements. It is also assumed that an address mapping scheme and a corresponding bank-offset generator and data shufflers are available and used, allowing to simultaneously access a data vector comprised of multiple matrix elements that are mapped on address sequences involving particular power-of-2-strides. This way, vectors can be accessed covering rows or parts of a row, as well as columns or parts of a column with all banks simultaneously providing the corresponding matrix elements making up the vector (or sub-matrix).

In the following exemplary description, a memory system is assumed with eight banks, which makes it possible to always access 8 matrix elements in parallel due to the bank offset generator and the data shufflers.

The proposed concept is based on the attachment of a vectors unit (not shown) to the output of the 8 banks—typically implemented via a bus system—which is enabled to process 8 stencils in parallel. In this example, a 2D stencil will be used, for which the vector unit is a 1D stencil vector unit. In case of a 3D stencil, a 2D vector unit will be used. To allow a simpler visualization, the 2D case is discussed; however, the same concepts apply to the vector-based processing of 3D stencils as well.

FIG. 4 shows a larger part of a matrix 400 that is stored in the memory system (not shown). It may also be noted that the memory system may be a main memory of a computer system or a cache memory of any level of a processing unit.

In a first phase (phase 1a), the rows covering the leftmost 8 columns 402 will be accessed, one after the other from the top to the bottom and be sent to the stencil vector unit for processing. By applying pipelining techniques, the operand values of each stencil calculation (especially related to the top and bottom neighbors) can be delayed to a correct amount of time ensuring that these all arrive at the required time at the input of the stencil calculation units.

The output of the vector unit comprises a sequence of updated rows that are part of the updated matrix, with each row containing the updated values for the 6 elements in the middle—shown as squares with a pattern—which are then written into a different memory location or a different part of the same memory. Thereby, for efficiency reasons, the boundary elements in each row may remain either unchanged or have an undefined value. For the sake of simplicity, the white squares of the columns 402 indicate the boundaries of the 8-element rows that are processed consecutively by the stencil vector unit, and the patterned cells represent the updated said values (which are written to different memory on memory region as indicated above).

In a next phase (phase 1b), the rows comprising a next group of 8 matrix columns 404 are processed from top to bottom in the same way, resulting in the patterned cells of the columns 404 being updated as described above. The dashed line 406 may be regarded as a border between two tiles in the memory.

The regions with the white boundary cells (two of which are referenced by reference numeral 408) can be regarded as a tile, e.g. equivalent to the tile 402. The same applies to the region with the white boundary cells (one of which is reference with reference numeral 412), e.g., tile 404.

It should be noted that in practice the total storage capacity of the memory banks allows to store large matrices. As a result, the width of a tile (i.e., the row length of a tile, in the example 8), as shown in FIG. 4 in a typical system is expected to be in the range between 8 and 64 elements, although also other numbers are possible. At the same time, the depth of a tile (i.e., measured in a vertical direction, e.g., from top to bottom as indicated by the arrows 416) can be very large in the order of thousands or more. Also the number of tiles stored in a memory system can be much larger than the two (i.e., 402, 404) shown in FIG. 4 from the left to the right: dependent on the total storage capacity these can be in the order of tens, hundreds or even thousands.

The latter has certainly consequences: ideally, in order to maximize the utilization of the available memory bandwidth, each element is only read once. For example, to calculate the left boundary 412 of the right tile 404, one could store the right boundary 414 of the left tile 402 in a temporary buffer. To calculate the left boundary of the right tile 404, only the buffer would need to be accessed to read the right boundary cells of the left tile 402.

The main problem, however, is that because the tile can be very deep, such a buffer would have to be very large, which does not make this a feasible and/or effective solution. Hence, this is not the problem-solving solution. Instead, the proposed concept solves the above problem by exploiting the unique properties of the mapping scheme and corresponding vector-based access functions involving a bank offset calculation unit and the data shuffler such that called or accessed rows of the tile can always be accessed and processed at once.

Firstly, the tiles are processed top to bottom, as discussed before (phase 1a, 1b). However, now the mapping properties can be exploited that allow to also access both, the rows and the columns in a perfectly interleaved fashion from the memory banks. This is done by processing the elements that cover the four consecutive columns 418—as shown in FIG. 5 in exactly the same way using the same vector unit as for the processing of the consecutive rows, described above (phase2).

Because of the mapping properties, in the exemplary case here, eight elements of each column can be retrieved in parallel. I.e., the processing sequence runs now from left to right (or the other way around) is indicated by arrows 508 (indicating one column). The four 8-element vectors in the consecutive columns in the boundary region are shown by reference numeral 506, representing sub-tiles with a squared pattern, orthogonal to the first processing direction. Once the upper sub-tile, in this case, has been completed the next sub-tile below will be processed. The horizontally striped cells (one of which is indicated with 510) are now the new boundary regions for this new direction of computing of this new tiling. A plurality of such boundary regions may be combined to a new logical horizontally oriented tile.

An interesting aspect, in this case, is that the "processing depth" open parent number of consecutive vectors—either rows or columns) is very small, being only 4 8-element vertical vectors. As a result, the buffering that was discussed above, which was not feasible because of the large depth of the bigger tiles, as shown in FIGS. 4 and 5, is now feasible. Because the sub-tiles have a much smaller depth, the buffering can be exploited very efficiently to calculate the boundary cells in the sub tiles (only the ones on top and at the bottom—the other boundaries were already calculated as part of a bigger type processing).

According to another aspect of the proposed concept, for very large matrices that do not fit into the memory system or component and for which therefore also tiling must be applied at a larger granularity, the "left and right" tile boundaries (as shown in FIGS. 4 and 5) can be efficiently accessed as vectors in the memory system and transferred to another memory system or component for further processing on the neighboring tiles.

For completeness reasons, FIG. 6 shows a block diagram of the stencil processing unit 600 for performing n-dimensional (nD) stencil processing using vector processing units adapted for processing stencils in parallel. The system 600 comprising a memory unit 602 organized in a plurality of memory banks 604 for storing elements of an nD (n-dimensional) matrix, and an (n−1)D stencil vector unit 606 adapted for processing, in a first phase, the nD matrix in a first processing direction of the matrix tile-wise. The data elements of the nD matrix processed by the stencil vector unit 606 in parallel are equally distributed over the memory banks, and the number of memory banks 604 is equal to the number of data elements processable by the stencil vector unit in parallel, which can be equal to the number of data elements in a width direction of one of the tiles.

The system 600 comprises further a grouping unit 608 adapted for grouping boundary elements in the width direction of the tiles into a nD sub-matrix. Thereby the (n−1)D stencil vector unit 606 is adapted for processing, in a second phase, the nD sub-matrix equally to the processing the nD matrix in the first phase orthogonal to the first processing direction. It may be noted that the grouping unit 608 is basically the data shuffler discussed before.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the system 600 for performing n-dimensional stencil processing using vector processing units adapted for processing stencils in parallel may be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The following clauses describe embodiments of a method, system and computer program product:

1. A computer-implemented method for performing n-dimensional (nD) stencil processing using vector processing units adapted for processing stencils in parallel, the method comprising:

providing a memory unit organized in a plurality of memory banks for storing elements of an nD (n-dimensional) matrix, processing, in a first phase, the nD matrix using a (n−1)D stencil vector unit in a first processing direction of the matrix tile-wise, wherein data elements of the nD matrix processed by the stencil vector unit in parallel are equally distributed over the memory banks, and wherein the number of memory banks is equal to the number of data elements processable by the stencil vector unit in parallel, which is equal to the number of data elements in a width direction of one of the tiles.

grouping boundary elements in the width direction of the tiles into a nD sub-matrix, and processing, in a second phase, the nD sub-matrix equally to the processing the nD matrix in the first phase orthogonal to the first processing direction.

2. The method according to clause 1, wherein n is equal to 2 or n is equal to 3.

3. The method according to clause 1 or 2, wherein the memory unit comprises dual-port memory cells.

4. The method according to any of the preceding clauses, wherein the boundary elements comprise two elements at each end of each row in a tile.

5. The method according to any of the preceding clauses, wherein outer elements are not updated during processing of a tile.

6. The method according to any of the preceding clauses, wherein the processing of the first phase and the processing of the second phase may be performed in.

7. The method according to any of the preceding clauses, wherein the width of a tile is comparable small if compared to the depth of the matrix.

8. The method according to any of the preceding clauses, wherein a bank offset generator and a data shuffler are adapted to distribute matrix elements equally across the memory banks for an always parallel access.

9. The method according to any of the preceding clauses, wherein the width direction is a 1-dimension measure or a 2-dimensional measure.

10. The method according to any of the preceding clauses, wherein data elements not being processed in the first phase and required during the second processing phase are stored in an intermediate storage and retrieved from there during the second processing phase.

11. The method according to any of the preceding clauses, also comprising data elements, during the processing in the second phase, comprising boundary elements required for a processing of subsequent nD sub-matrices are stored in a first-in-first-out storage unit and are retrieved during the processing of the respective subsequent nD sub-matrices.

12. The method according to any of the preceding clauses, also comprising configuring the stencil vector unit before each computation.

13. A stencil processing unit for performing n-dimensional (nD) stencil processing using vector processing units adapted for processing stencils in parallel, the system comprising a memory unit organized in a plurality of memory banks for storing elements of an nD (n-dimensional) matrix, an (n−1)D stencil vector unit adapted for processing, in a first phase, the nD matrix in a first processing direction of the matrix tile-wise, wherein data elements of the nD matrix processed by the stencil vector unit in parallel are equally distributed over the memory banks, and wherein the number of memory banks is equal to the number of data elements processable by the stencil vector unit in parallel, which is equal to the number of data elements in a width direction of one of the tiles.

a grouping unit adapted for grouping boundary elements in the width direction of the tiles into a nD sub-matrix, and wherein the (n−1)D stencil vector unit is adapted for processing, in a second phase, the nD sub-matrix equally to the processing the nD matrix in the first phase orthogonal to the first processing direction.

14. The system according to clause 13, wherein n is equal to 2 or n is equal to 3.

15. The system according to claim 13 or 14, wherein the memory unit comprises dual-port memory cells.

16. The system according to any of the clauses 13 to 15, wherein the boundary elements comprise two elements at each end of each row in a tile.

17. The system according to any of the clauses 13 to 16, wherein (n−1)D stencil vector unit is also adapted for omitting updating the outer elements during processing of a tile.

18. The system according to any of the clauses 13 to 17, wherein the processing of the first phase and the processing of the second phase may be performed in parallel.

19. The system according to any of the clauses 13 to 18, wherein the width of a tile is comparable small if compared to the depth of the matrix.

20. The system according to any of the clauses 13 to 19, also comprising a bank offset generator and a data shuffler adapted to distribute matrix elements equally across the memory banks for an always parallel access.

21. The system according to any of the clauses 13 to 20, wherein the width direction is a 1-dimension measure or a 2-dimensional measure.

22. The system according to any of the clauses 13 to 21, also comprising an intermediate storage adapted for storing data elements not being processed in the first phase and required during the second processing phase and retrievable from the intermediate storage during the second processing phase.

23. The system according to any of the clauses 13 to 22, wherein the stencil vector unit is in the second phase also adapted for storing data elements comprising boundary elements required for a processing of subsequent nD sub-matrices in a first-in-first-out storage unit and retrieving during the processing of the respective subsequent nD sub-matrices.

24. The system according to any of the clauses 13 to 23, wherein the stencil vector unit is also adapted for a configuration before each computation.

25. A computer program product for performing n-dimensional (nD) stencil processing using vector processing units adapted for processing stencils in parallel, said computer program product comprising a computer readable storage medium having program instructions embodied therewith, said program instructions being executable by one or more computing systems or controllers to cause said one or more computing systems to
provide a memory unit organized in a plurality of memory banks for storing elements of an nD (n-dimensional) matrix,
process, in a first phase, the nD matrix using a (n−1)D stencil vector unit in a first processing direction of the matrix tile-wise,
wherein data elements of the nD matrix processed by the stencil vector unit in parallel are equally distributed over the memory banks, and
wherein the number of memory banks is equal to the number of data elements processable by the stencil vector unit in parallel, which is equal to the number of data elements in a width direction of one of the tiles.
group boundary elements in the width direction of the tiles into a nD sub-matrix, and
process, in a second phase, the nD sub-matrix equally to the processing the nD matrix in the first phase orthogonal to the first processing direction.

What is claimed is:

1. A computer-implemented method for performing n-dimensional (nD) stencil processing using vector processing units adapted for processing stencils in parallel, the method comprising:
providing a memory unit organized in a plurality of memory banks for storing elements of an nD (n-dimensional) matrix, wherein n is greater than 1;
processing, in a first phase, the nD matrix using a (n−1)D stencil vector unit in a first processing direction of the matrix tile-wise;
wherein data elements of the nD matrix processed by the stencil vector unit in parallel are equally distributed over the memory banks, and
wherein the number of memory banks is equal to the number of data elements processable by the stencil vector unit in parallel, which is equal to the number of data elements in a width direction of one of the tiles;
grouping boundary elements in the width direction of the tiles into a nD sub-matrix, and
processing, in a second phase, the nD sub-matrix equally to the processing the nD matrix in the first phase orthogonal to the first processing direction.

2. The method according to claim 1, wherein n is equal to 2 or n is equal to 3.

3. The method according to claim 1, wherein the memory unit comprises dual-port memory cells.

4. The method according to claim 1, wherein the boundary elements comprise two elements at each end of each row in a tile.

5. The method according to claim 1, wherein outer elements are not updated during processing of a tile.

6. The method according to claim 1, wherein the processing of the first phase and the processing of the second phase may be performed in parallel.

7. The method according to claim 1, wherein the width of a tile is comparable small if compared to the depth of the matrix.

8. The method according to claim 1, wherein a bank offset generator and a data shuffler are adapted to distribute matrix elements equally across the memory banks for an always parallel access.

9. The method according to claim 1, wherein the width direction is a 1-dimension measure or a 2-dimensional measure.

10. The method according to claim 1, wherein data elements not being processed in the first phase and required during the second processing phase are stored in an intermediate storage and retrieved from there during the second processing phase.

11. The method according to claim 1, further comprising:
data elements, during the processing in the second phase, comprising boundary elements required for a processing of subsequent nD sub-matrices are stored in a first-in-first-out storage unit and are retrieved during the processing of the respective subsequent nD sub-matrices.

12. The method according to claim 1, further comprising:
configuring the stencil vector unit before each computation.

13. A stencil processing unit for performing n-dimensional (nD) stencil processing using vector processing units adapted for processing stencils in parallel, the system comprising:
a memory unit organized in a plurality of memory banks for storing elements of an nD (n-dimensional) matrix, wherein n is greater than 1;
an (n−1)D stencil vector unit adapted for processing, in a first phase, the nD matrix in a first processing direction of the matrix tile-wise;
wherein data elements of the nD matrix processed by the stencil vector unit in parallel are equally distributed over the memory banks, and
wherein the number of memory banks is equal to the number of data elements processable by the stencil vector unit in parallel, which is equal to the number of data elements in a width direction of one of the tiles;
a grouping unit adapted for grouping boundary elements in the width direction of the tiles into a nD sub-matrix, and
wherein the (n−1)D stencil vector unit is adapted for processing, in a second phase, the nD sub-matrix equally to the processing the nD matrix in the first phase orthogonal to the first processing direction.

14. The system according to claim 13, wherein n is equal to 2 or n is equal to 3.

15. The system according to claim 13, wherein the memory unit comprises dual-port memory cells.

16. The system according to claim 13, wherein the boundary elements comprise two elements at each end of each row in a tile.

17. The system according to claim 13, wherein (n−1)D stencil vector unit is also adapted for omitting updating the outer elements during processing of a tile.

18. The system according to claim 13, wherein the processing of the first phase and the processing of the second phase may be performed in parallel.

19. The system according to claim 13, wherein the width of a tile is comparable small if compared to the depth of the matrix.

20. A computer program product for performing n-dimensional (nD) stencil processing using vector processing units adapted for processing stencils in parallel, said computer program product comprising a computer readable storage medium having program instructions embodied therewith, said program instructions being executable by one or more computing systems or controllers to cause said one or more computing systems to provide a memory unit organized in a plurality of memory banks for storing elements of an nD (n-dimensional) matrix, wherein n is greater than 1;

process, in a first phase, the nD matrix using a (n−1)D stencil vector unit in a first processing direction of the matrix tile-wise, wherein data elements of the nD matrix processed by the stencil vector unit in parallel are equally distributed over the memory banks, and wherein the number of memory banks is equal to the number of data elements processable by the stencil vector unit in parallel, which is equal to the number of data elements in a width direction of one of the tiles;

group boundary elements in the width direction of the tiles into a nD sub-matrix; and process, in a second phase, the nD sub-matrix equally to the processing the nD matrix in the first phase orthogonal to the first processing direction.

* * * * *